United States Patent
Fainstain et al.

(10) Patent No.: US 7,693,347 B2
(45) Date of Patent: Apr. 6, 2010

(54) SMEAR CORRECTION IN A DIGITAL CAMERA

(75) Inventors: Eugene Fainstain, Netanya (IL); Yoav Lavi, Raanana (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 661 days.

(21) Appl. No.: 11/467,044

(22) Filed: Aug. 24, 2006

(65) Prior Publication Data
US 2007/0052822 A1    Mar. 8, 2007

Related U.S. Application Data (60) Provisional application No. 60/711,156, filed on Aug. 24, 2005.

(51) Int. Cl.
*H04N 5/262*    (2006.01)
*G06K 9/32*    (2006.01)
*G06K 9/36*    (2006.01)

(52) U.S. Cl. .................. 382/289; 348/239; 382/296
(58) Field of Classification Search .............. 348/222.1, 348/239; 382/289, 296, 297
See application file for complete search history.

(56) References Cited

U.S. PATENT DOCUMENTS

| | | | | |
|---|---|---|---|---|
| 5,832,110 | A * | 11/1998 | Hull | 382/168 |
| 7,349,567 | B2 * | 3/2008 | Leonard et al. | 382/151 |
| 2004/0019253 | A1 * | 1/2004 | Tsujita et al. | 600/118 |
| 2004/0170299 | A1 * | 9/2004 | Macy et al. | 382/100 |

* cited by examiner

*Primary Examiner*—Timothy J Henn
(74) *Attorney, Agent, or Firm*—Samsung Electronics Co., Ltd.

(57) ABSTRACT

Methods and apparatus to measure small shifts and rotations of video images captured in short succession after a first reference video image is captured, and to add the sequence of captures while shifting or rotating back the shifted or rotated images, in order to improve the SNR in low light conditions.

5 Claims, 11 Drawing Sheets

SMEAR CORRECTION IN A DIGITAL CAMERA

CROSS-REFERENCES TO RELATED APPLICATIONS

This application is a non-provisional of, and claims the benefit of, co-pending, commonly assigned U.S. Provisional Patent Application No. 60/711,156, entitled "METHODS AND APPARATUS FOR SMEAR CORRECTION IN A DIGITAL CAMERA," filed on Aug. 24, 2005, which application is incorporated herein by reference for all purposes.

BACKGROUND OF THE INVENTION

1. Field

Embodiments of the present invention relate generally to capturing digital images. More specifically, embodiments of the invention relate to systems and methods for smear correction in digitally-captured images.

2. Related Art

Smearing of pictures is a phenomena where pictures may be blurred due to hand motion, as the hand-held camera may not be completely steady. The effect of the smearing may increase along with the exposure time. However, when the lighting conditions are poor, it may be desirable to use long exposure time in order to improve the signal to noise ratio (SNR) of the image. Hand-held video cameras may be equipped with mechanical or electronic stabilizers which may mitigate unstable handling of the video camera during the shot. However, such stabilizers may not provide adequate SNR improvements, as the stabilizers may not completely cancel the effects of the motion. Further, the stabilizers may be expensive and bulky.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
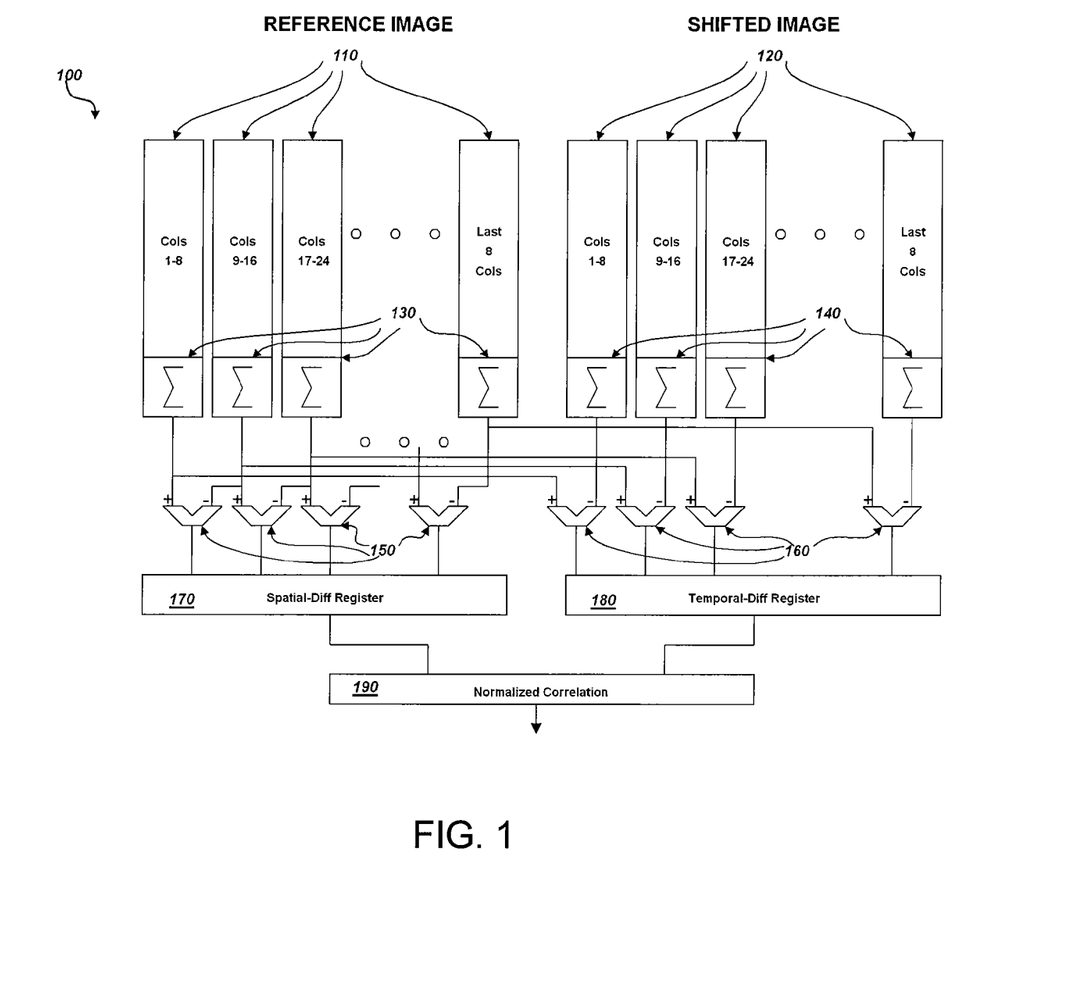
FIG. 1 is a diagram graphically depicting embodiments of the present invention.

FIG. 1 is an illustration of an algorithm 100 in accordance with embodiments of the present invention, and according to which pan and/or shift movement in the x dimension is measured. It should be noted that FIG. 1 illustrates the algorithm in a graphical way, and is given for clarity rather than as a description of an actual implementation.

In the Figure, pixel values of column groups 110 of the reference image are summed by summing units 130, to yield a vector of numbers, each representing the sum of pixels in a column group. Column groups 110 are illustrated as comprising 8 columns each. However, this is an arbitrary number, and any other number may be used, according to the present invention.

Subtractors 150 subtract each such sum from the sum of the column group to its right. This subtraction yields a spatial-difference vector, which is stored in Spatial-Difference Register 170.

Similarly, pixel values of column groups 120 of the shifted image are summed by summing units 140, to yield a vector of numbers, each representing the sum of pixels in a column group. Again, column groups 120 comprise 8 columns each, in this specific example.

Subtractors 160 subtract each such sum from the sum of the column group of the reference image. This subtraction yields a temporal-difference vector, which is stored in Temporal-Difference Register 180.

The vectors stored in Spatial-Difference register 170 and temporal Difference Register 180 are next correlated. The correlation result is normalized, and will equal +1.0 if the temporal shift is identical to the spatial shift, i.e. 8 pixels in the depicted case where groups of eight columns are used. In the general case, where the temporal shift and the spatial shift are not necessarily equal, temporal shift can be calculated by multiplying the correlation result by the number of columns in a column group.

The above formula is valid for a shift range of 0 to +8 for the case of eight columns in a column group, and 0 to +n in the general case. Inaccuracies stem mainly from the edges, and are usually negligible. Outside said range, large errors may occur, and the results should only be used as out-of-range indicator.

To cover for wider range of numbers, the correlation described above has to be recalculated for a shifted version of the spatial difference vector; for example, to cover for the range of 0 to −8, a second correlation is calculated where elements of the spatial diff register may be shifted by one relative to element of the temporal diff register. Re-correlation may be done by Normalized Correlation 190, reusing its internal computation resources.

As would be evident to those ordinarily skilled in the art, the same algorithm may be used for tilt and/or shift in movement in the vertical dimension, when row groups rather than column groups are summed.

Figure 2:
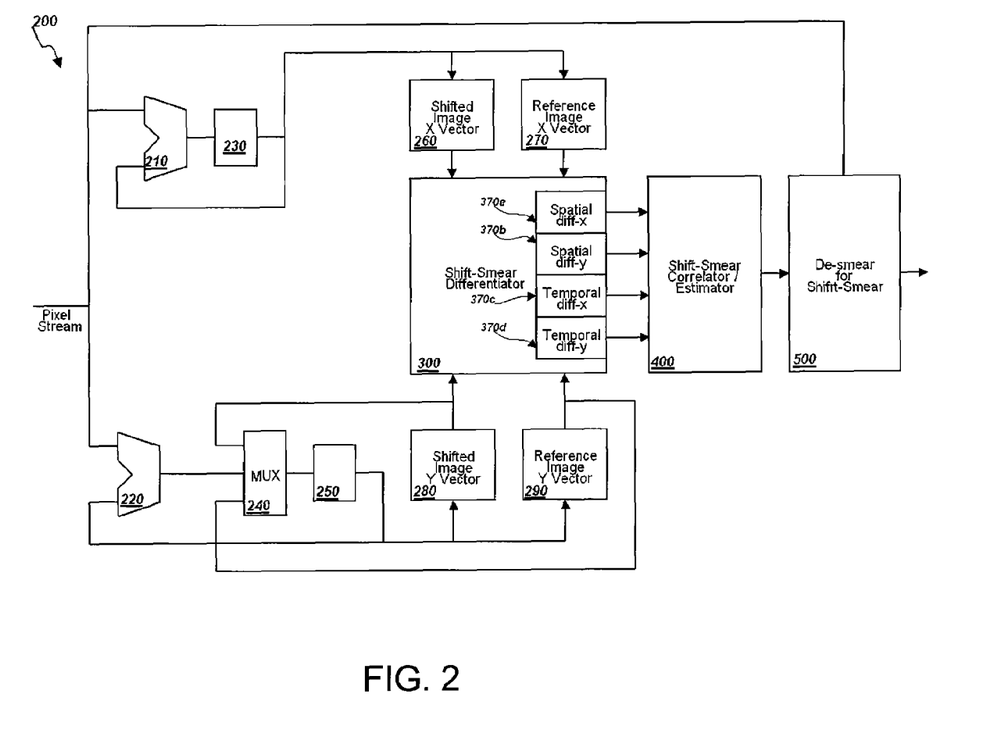
FIG. 2 is a simplified block diagram of an embodiment of the present invention, which embodiment can detect and correct shift smear.

FIG. 2 depicts a simplified block diagram of an embodiment 200 of the present invention, which can detect and correct shift smear. It is assumed that the image is scanned row by row. Embodiment 200 comprises, among others, column and row accumulation circuits. Adder 210 and register 230 accumulate pixel values in groups of rows. As scan order is such that groups of rows can be summed successively, this part of the circuit is straight forward—Adder 210 and Register 230 accumulate the pixel stream; when a group of rows terminates, a Control Unit (not shown) stores the contents of Register 230 in Vector RAMs 260 or 270, for further processing, and clears Register 230 for the accumulation of the next group of rows.

The Control Unit, which is not shown, is also in charge of advancing the Vector RAMs address so that it will point to the next element of the X vector after the next group of rows is accumulated. In addition, it selects Reference Image Vector RAM 270 when the reference image is scanned, and Shifted Image Vector RAM 260 when the shifted image is scanned.

The accumulation of the values of groups of columns, according to this specific embodiment, is different, because the pixels to be summed for a column group are not contiguous in the incoming pixel stream. Whenever a segment of pixels belonging to a certain column group starts, the current value of the partial sum for that group is read from one of Vector RAMs 280 or 290, through MUX 240 and into register 250. When the reference image is scanned, Reference Image vector RAM 290 is used, and when the shifted image is scanned, Shifted Image vector RAM 280 is used. The pixels belonging to that segment are then accumulated in Register 250, when Adder 220 sums the old value with the new values, and MUX 240 transferring the result of Adder 220 to Register 250. When the segment stops, the value in Register 250 is written to Vector RAM 280 or Vector Ram 290, replacing the previous partial sum for that column group.

X vectors of the reference and shifted Images 270 and 260, and Y vectors of the reference and shifted Images 290 and 280, are input to Shift-Smear Differentiator Unit 300, which calculates the spatial and temporal difference vectors, and stores them in its Spatial diff-x 370a, Spatial diff-y 370b, Temporal diff-x 370c, and Temporal diff-y 370d memory units.

Shift-Smear Correlator/Estimator 400 calculates the horizontal and vertical shifts between the reference and the shifted images according to the present invention, based on the Spatial and Temporal diff memory units 370a, 370b, 370c, and 370d.

De-smear unit 500, accumulates pixels from a sequence of exposures, correcting the shift smear, according to shift values input from Correlator/Estimator 400. Said correction consists of summing the reference image values with values of successive shifted images, shifting the shifted images by the inverse of the detected shift value while they are added.

Figure 3:
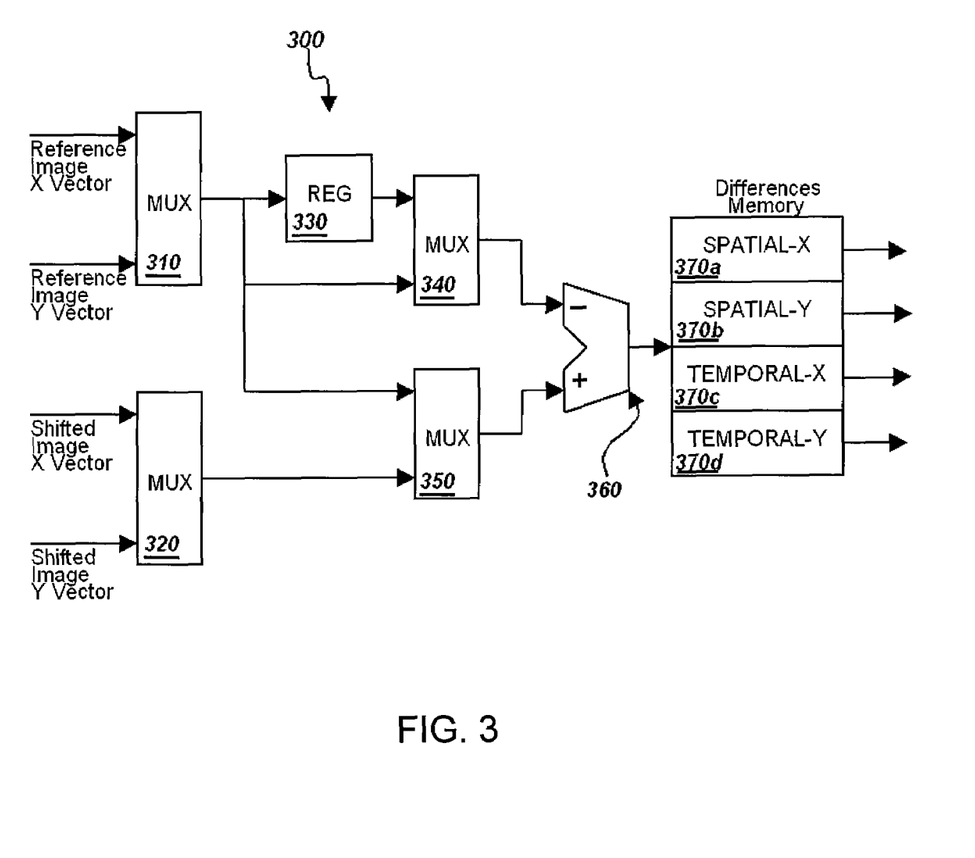
FIG. 3 depicts a simplified block diagram of an embodiment of a differentiator for shift smear.

FIG. 3 depicts a simplified block diagram of an embodiment of a differentiator for shift smear 300. Inputs to differentiator 300 are shifted image X vector 260, Reference image X vector 270, shifted image Y vector 280, and Reference image Y vector 280 (all in FIG. 2).

The differentiation calculation may be done serially, using a single subtractor 360. The time to do the calculations may be in the vertical blank period, when a pixel stream is not generated. A Control unit (not shown) will control the inputs to Subtractor 360, using Multiplexer units 310, 320, 340, 350. The Control Unit will also generate Read and Write signals, as well as address inputs, for Difference Memory segments 370a, 370b, 370c and 370d, where, respectively, Spatial X, Spatial Y, Temporal X and Temporal Y difference vectors will be stored.

When Spatial-X difference of the Reference image is calculated, MUX 310 will route Reference Image X Vector 270 output to REG 330 and to MUX 350, and MUX 350 will route MUX 310 input to the Plus input of Subtractor 360. MUX 340 will route REG 330 output to the Minus input of Subtractor 360.

All Reference Image X Vector elements will be read from memory 270, in an order which may be left to right. Register 330 may function as a delay unit, delaying its input value by one clock cycle. Consequently, the output of Register 330 will be hold the value of an X vector element corresponding to column group n while the input to Register 330 is already asserted with the value corresponding to column group n+1. As MUX 340 now routes Register 330 output to the minus input of Subtractor 360, Subtractor 360 will subtract the value of column group n, from column group n+1. The results will be stored in the SPATIAL-X Difference Memory 370*a*.

Similarly, the SPATIAL-Y part may be calculated by setting MUX 310 to route Reference Image Y Vector 290 on its input to Register 330 and MUX 350, MUX 350 may be set to route MUX 310 output to the Plus input of Subtractor 360, and MUX 340 may route the output of Register 330 to the Minus input of Subtractor 360. Scanning of Y Vector elements may be done from top to bottom row groups, and, consequently, Register 330 may output the value corresponding to row group n while its input is asserted with the value corresponding to row group n+1, so that Subtractor 360 will generate the SPATIAL-Y difference results. The outputs from Subtractor 360 are stored in the SPATIAL-Y Memory 370*b*.

For the calculation of the temporal difference vectors, MUX 350 may route the output of MUX 320 to Subtractor 360 Plus input, and MUX 340 may route the output of MUX 310 to the Minus input of Subtractor 360. Register 330 is not used. When Temporal-X difference is calculated, MUX 310 will route Reference Image X Vector memory 270 to MUX 340, which will route it to Subtractor 360 Minus input, while MUX 310 will route Shifted Image X Vector memory 260 to MUX 350, which will route it to Subtractor 360 Plus input. Memories 270, 260 may be scanned so as to output all entries. The outputs from Subtractor 360, representing the temporal difference in the X dimension, will be stored in the TEMPORAL-X Difference Memory 370*c*.

Similarly, When Temporal-Y difference is calculated, MUX units 310,320,340 and 350 will route memory units 290, 280 to Subtractor 360, and the subtraction results will be stored in the TEMPORAL-Y Difference Memory 370*d*.

It should be noted that the sign of the spatial difference will be positive of the value of a subsequently read element is larger than the value of the previous element. Likewise, the sign of the temporal difference will be positive if the value for the Shifted Image is larger than that of the Reference Image. As would be obvious to those ordinarily skilled in the art, a MUX unit could be saved from embodiment 300 if the sign of the temporal or spatial difference vector could be negated, a negation which could be taken care of in further processing steps. Such an embodiment is not shown for the sake of clarity, but it falls within the scope of the present invention.

Figure 4:
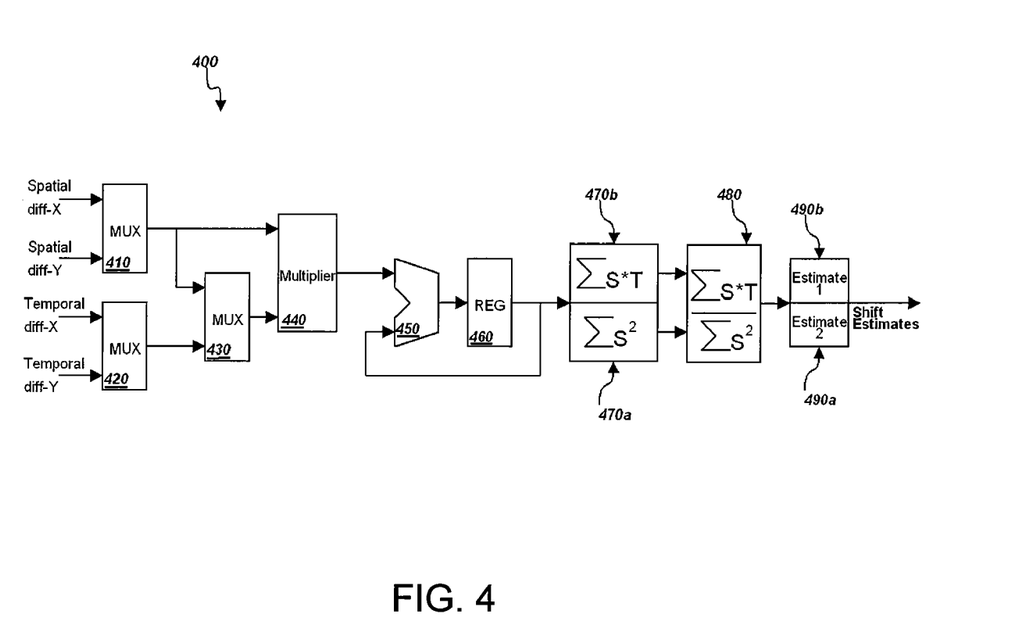
FIG. 4 depicts a simplified block diagram of an embodiment of a Correlator/Estimator for shift-smear.

FIG. 4 depicts a simplified block diagram of an embodiment of Correlator/Estimator 400 for shift-smear. The inputs to Correlator/Estimator 400 are the SPATAIL-X, SPATAIL-Y, TEMPORAL-X and TEMPORAL-Y difference memories 370*a*, 370*b*, 370*c* and 370*d*, respectively (FIG. 3). Correlator/Estimator 400 may work in series, correlating for the X dimension then, reusing the arithmetic units, correlating for the Y dimension; yet further it would reuse the arithmetic units to calculate correlation for another range; e.g. 0 to −8. Alternatively, the order may be reversed. Yet alternatively some or all of the correlations can be done in parallel.

When X-dimension correlation is calculated, MUX units 410, 420 route the SPATIAL-X and SPATIAL-Y difference memories 370*a*, 370*c*, to their outputs.

Each correlation calculation of the X and Y dimensions comprises, according to this specific embodiment, two cycles, where each of the two cycles comprises two phases. The two cycles may be used for two ranges of correlations, and the two phases of each cycle may be used so that in the First Phase the accumulation of the squares of the values of the Spatial difference vector is calculated, and in the Second Phase the multiplication products of elements of the Spatial Difference and the Temporal Difference vectors are accumulated. The terms "First Phase" and "Second Phase" are used throughout the foregoing description for the sake of clarity, but, as would be obvious to those ordinarily skilled in the art, the order of the phases may be changed, or the two phases can be done in parallel, all in the scope of the present invention.

In the First Phase of each of the two cycles, MUX 430 routes the output of MUX 410 to its output and in the Second Phase MUX 430 routes the output of MUX 420 to its output. Multiplier 440 multiplies the output of MUX 410 with the output of MUX 430. Hence, in the First Phase Multiplier 440 will calculate the square of the spatial difference elements, and in the Second Phase it will calculate the multiplications of spatial and temporal difference elements.

Adder 450 and Register 460 accumulate the results of the multiplications. Register 460 will be cleared at the beginning of each Phase. After the First Phase its contents will be transferred to register 470*a* (designated $\Sigma S^2$) for the storage of the accumulation of the squares of the Spatial vector elements. After the Second Phase, the contents of Register 460 will be transferred to register 470*b* (designated $\Sigma S*T$) for the storage of the accumulation of the multiplications of Spatial and Temporal elements. This process will repeat in the two cycles.

In each of the two cycles, divider 480 divides the sum of the accumulation of the multiplications of Spatial and Temporal elements ($\Sigma S*T$) by the accumulation of the square Spatial vector elements ($\Sigma S^2$), to yield the shift estimate for that specific cycle. This may be done once for the X dimension and once for the Y dimension. The estimate results for the first cycle, referring to a first range of possible shifts (e.g. 0 to 8), may be stored in Register 490*b*, while the estimate results for the second cycle, referring to a second range of possible shifts (e.g. −8 to 0) may be stored in register 490*a*.

The disclosure of embodiments for the estimate of a shift in a captured image relative to a reference image is now completed. Other embodiments of the same functions under the present invention include several group sizes, several spatial difference estimates, which may or may not partly overlap, selection of captures in the sequence which are not necessarily the first capture as a Reference Image, and doing iterative X and Y dimension estimates, where the results of an estimate in one dimension are used to select the accumulation boundaries for the estimate in the other dimensions.

In addition, as would be appreciated by those ordinarily skilled in the art, trivial variations of the foregoing do not depart from the scope of the present invention.

Figure 5:
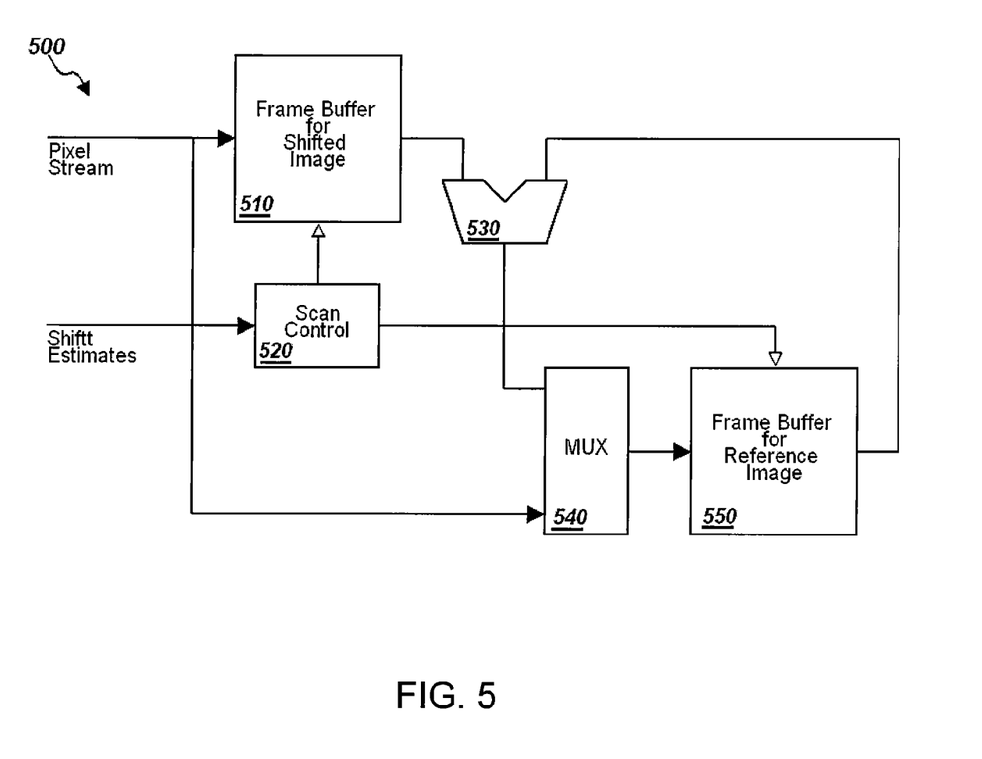
FIG. 5 depicts a De-smear circuit for shift-smear.

FIG. 5 depicts De-smear circuit 500 for shift-smear. When the Reference image is captured, MUX 540 will direct the incoming pixel stream to Frame Buffer 550, for storage. Subsequent images, which may be shifted relative to the reference image, are stored in Frame Buffer 510.

After a Shifted Image is stored in Frame Buffer 510, using Shift Estimates from Correlator/Estimator 400, the Reference image and the Shifted image may be accumulated, including shift smear correction. Said correction consists of summing the reference image values with values of successive shifted images, shifting the shifted images by the inverse of the detected shift values, while they are added. For example, if shift values of $(X_1,Y_1), (X_2,Y_2), \ldots (X_n,Y_n)$ are detected for a sequence of n shifted images following the Reference image, the smear corrected sum will be calculated by summing $-S(i, j)=\Sigma C_k (i-X_k, j-Y_k)$, where $S(i,j)$ is pixel $(i,j)$ of the sum image, $C_k(i,j)$ is pixel $(i,j)$ of the capture k, $C_0$ is the reference image and $(X_0,Y_0)=(0,0)$.

Reference Image from Frame Buffer 550 enters adder 530, where each pixel is added with a pixel of Shifted Image Frame Buffer 510. Scan Control unit 520 controls the address generation of both Reference Image Buffer 550 and Shifted Image Buffer 510, so that an inverse shift will take place, and pixels corresponding to the same point in the target object will be accumulated.

In another aspect of the present invention, rotation of the camera can be detected and estimated, and rotation smear can be corrected, including rotation which is not centered at the center of the image.

As can be shown using basic geometry, when an image rotates with an angle β around center of rotation ($C_x, C_y$), pixel ($P_x, P_y$) will shift horizontally and vertically. Assuming β is small, The horizontal shift will equal approximately $\Delta X = *(P_y - C_y)$ and the vertical shift will equal approximately $\Delta Y = \beta*(P_x - C_x)$.

Vertical shift for a vertical stripe at the left side of the screen, located −W pixels from the center of the screen will equal: $\Delta Y_{Left} = \beta*(-W - C_x)$. Similarly, vertical shift at a Right vertical stripe located +W pixels from the center of the screen will equal:

$\Delta Y_{right} = \beta*(W - C_x)$. For horizontal stripes at the Top and the Bottom of the screen, with distances H from the center, horizontal shifts of $\Delta X_{top} = *(H - C_y)$ and $\Delta X_{bottom} = \beta*(-H - C_y)$ will be observed.

It follows that any rotation of the image around any center can be characterized by the set ($\Delta Y_{left}$, $\Delta Y_{right}$, $\Delta X_{top}$, $\Delta X_{bottom}$). By adding linear X-dimension shift values to the X numbers of the set, and linear Y-dimension shift values to the Y numbers of the set, any combination of shift and rotate can be defined.

Rotation around an arbitrary point in the image which is not necessarily the center of the image is equivalent to a combination of rotation around the center and a shift. Consequently, detection and correction of non-centered rotation covers both centered shift and rotation, and is fully defined by the set ($\Delta Y_{left}$, $\Delta Y_{right}$, $\Delta X_{top}$, $\Delta X_{bottom}$). In the foregoing the term Rotation, Rotated Image and Rotation Smear imply a combination of centered rotation and shift.

Figure 6:
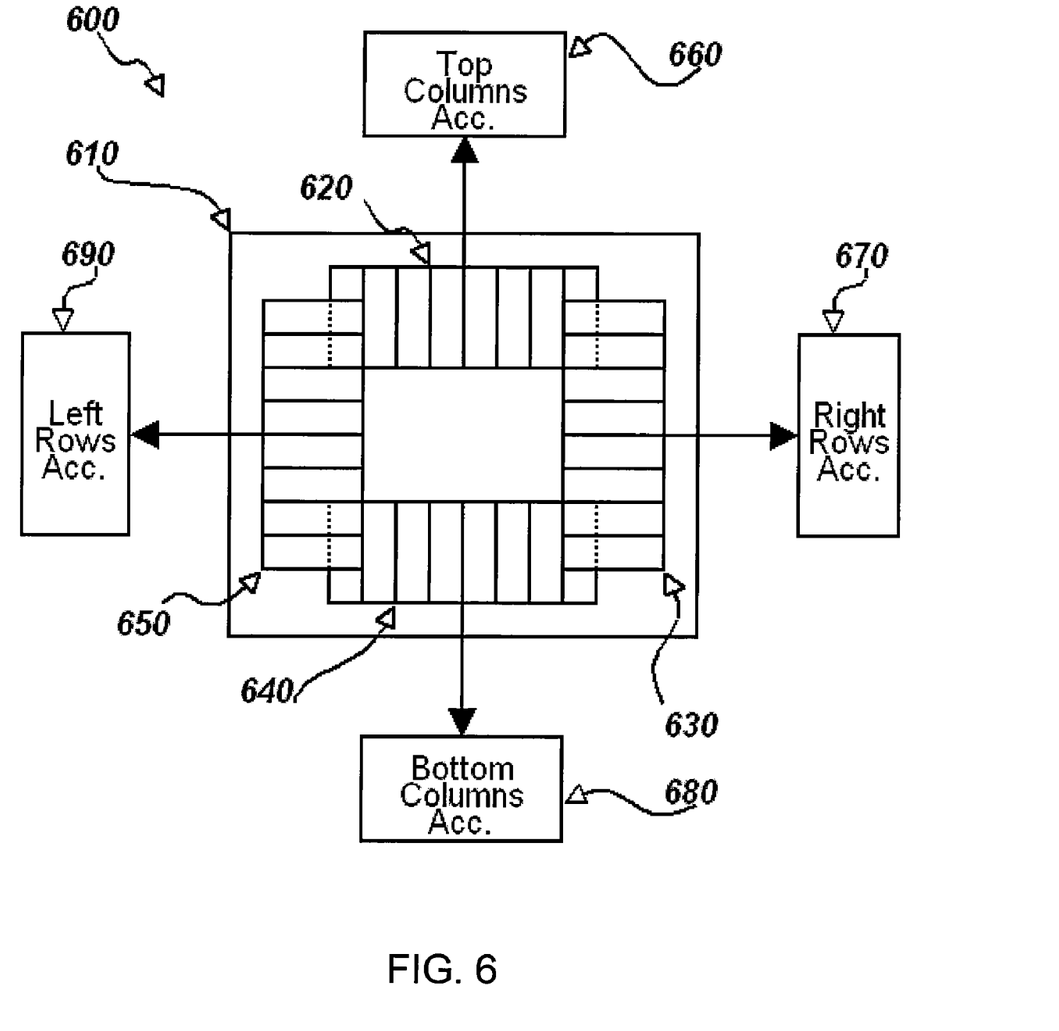
FIG. 6 is a diagram graphically depicting an embodiment of the present invention relating to motion measurement.

FIG. 6 is an illustration of an algorithm 600 in accordance with the present invention and according to which the rotation is measured. It should be noted that FIG. 6 illustrates the algorithm in a graphical way, and is given for clarity rather than as an example for an actual embodiment.

Algorithm 600 processes information from Sensor Array 610, which could be both the Reference Image and the Rotated Image.

Sensor Array 610 comprises zone 620 at its top half where column groups are accumulated, zone 630 at its right half where row groups are accumulated, zone 640 at its bottom half where column groups are accumulated, and zone 650 at its left half where row groups are accumulated. The zones may be non-overlapping or partially overlapping. The accumulation vectors are stores at Top Column Accumulator 660, Right Rows Accumulator 670, Bottom Column Accumulator 680 and Left Rows Accumulator 690.

Figure 7:
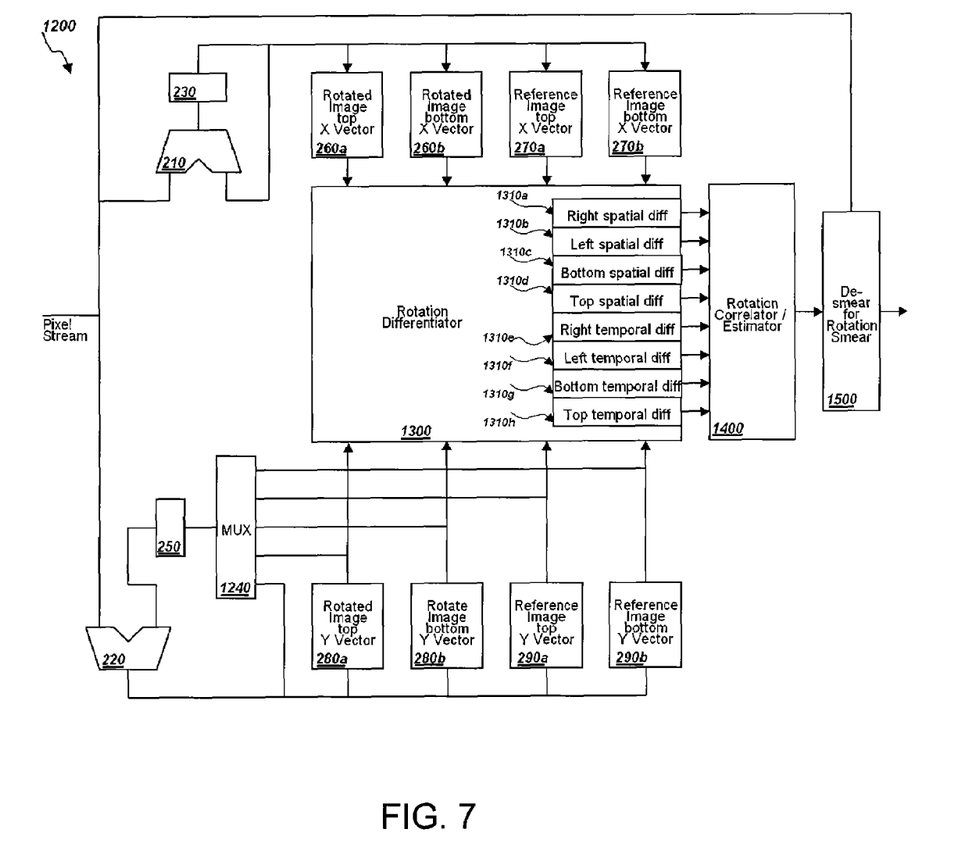
FIG. 7 depicts a simplified block diagram of an embodiment of the present invention, which embodiment can detect and correct Rotation Smear.

FIG. 7 depicts a simplified block diagram of an embodiment 1200 of the present invention, which can detect and correct Rotation Smear. FIG. 7 and FIG. 2 share several subunits, as can be observed from identical numbering of some of the units in FIG. 7.

It is assumed that the image is scanned row by row. Circuit 1200 comprises column accumulation circuits for the left and right halves, and row accumulation circuits for the top and bottom halves of the temporal and the reference image. Adder 210 and register 230 accumulate pixel values in groups of rows for the top and the bottom halves of the images. As scan order is such that groups of rows are summed successively, this part of the circuit is straight forward—Adder 210 and Register 230 accumulate the pixel stream; when a group of rows terminates, a Control Unit (not shown) stores the contents of Register 230 in Vector RAMs 260*a*, 260*b*, 270*a* or 270*b*, for further processing, and clears Register 230 for the accumulation of the next group of rows.

Said Control Unit is also in charge of advancing the Vector RAMs addresses so that they will point to the next element of the X vector after the next group of rows is accumulated. In addition, it selects Reference Image Bottom X Vector RAM 270*b*, Reference Image Top X Vector RAM 270*a*, Rotated Image Bottom X Vector RAM 260*b*, Rotated Image Top X Vector RAM 260*a*, according to the zone and the image being scanned.

The accumulation of the values of Left and Right groups of columns, according to this specific embodiment, is different, because the pixels to be summed for a column group are not contiguous in the incoming pixel stream. Whenever a segment of pixels belonging to a certain column group starts, the current value of the partial sum for that group is read from one of Vector RAMs 280*a*, 280*b*, 290*a*, 290*b* through MUX 1240 and into register 250. When the Reference image is scanned, Reference Image vector RAMs 290*a* or 290*b* are used, and when the rotated image is scanned, Rotated Image vector RAMs 280*a* or 280*b* are used.

Pixels belonging to a specific segment are accumulated in Register 250, with Adder 220 summing the old value with the new values, and MUX 1240 transferring the result of Adder 220 to Register 250. When the segment stops, the value in Register 250 is written to Vector RAM 280*a*, 280*b*, 290*a* or 290*b*, replacing the previous partial sum for that column group.

X vectors of the reference and rotated Images 270*a*, 270*b*, 260*a* and 260*b*, and Y vectors of the reference and rotated Images 290*a*, 290*b*, 280*a* and 280*b*, are input to Rotation Differentiator Unit 1300, which calculates the spatial and temporal difference vectors, and stores them in its Spatial-diff registers 1310*a*, 1310*b*, 1310*c*, and 1310*d*; and Temporal-diff registers 1310*e*, 1310*f*, 1310*g*, and 1310*f*

Rotation Correlator/Estimator 1400 calculates the horizontal and vertical shifts, of the Top, Bottom, Right and left halves, between the reference and the rotated images, according to the present invention, based on the Spatial and Temporal diff units 1310*a* through 1310*h*.

Rotation Correlator/Estimator 1400 may successively correlate for different ranges of shift values, for example 0 to 8 and 0 to −8, in each Top, Right, Bottom and Left. Alternatively, it may correlate for the different ranges in parallel, or in a combination of parallel and serial.

De-smear unit 1500 accumulates images from a sequence of exposures, correcting the rotation-smear, according Left, Right, Top and Bottom values input from Correlator/Estimator 1400. Said correction consists of summing the Reference image values with values of successive images which are rotated relative to the Reference image, rotating the rotated images by the inverse of the detected rotation while they are added.

Figure 8:
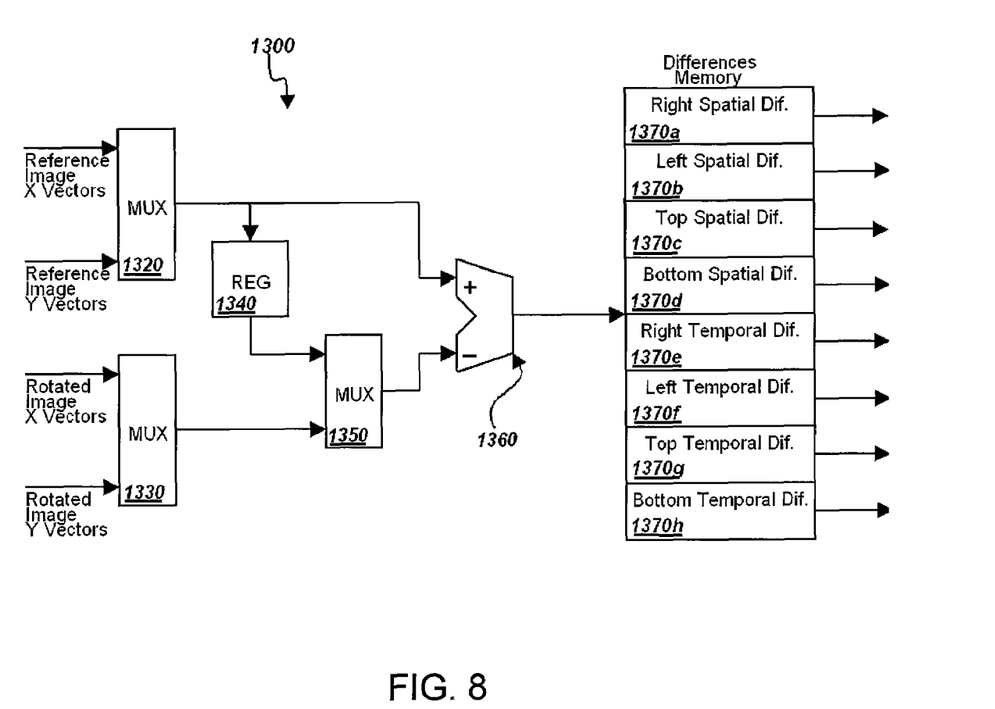
FIG. 8 depicts a simplified block diagram of an embodiment of a correlation part of the rotation estimation.

FIG. 8 depicts a simplified block diagram of an embodiment 1300 of the correlation part of the rotation estimation. It should be noted that FIG. 8 is similar to FIG. 3, and that in both cases similar correlations are calculated. For the rotation estimation, four rather than 2 correlations are calculated, top, right, bottom and left portions of the image. Horizontal shift is evaluated for the top and bottom halves, and vertical shift is evaluated for the left and right halves.

Differences Memories 1370a to 1370h, store the spatial and temporal difference value, for the top, right, bottom and left portions of the image.

Figure 9:
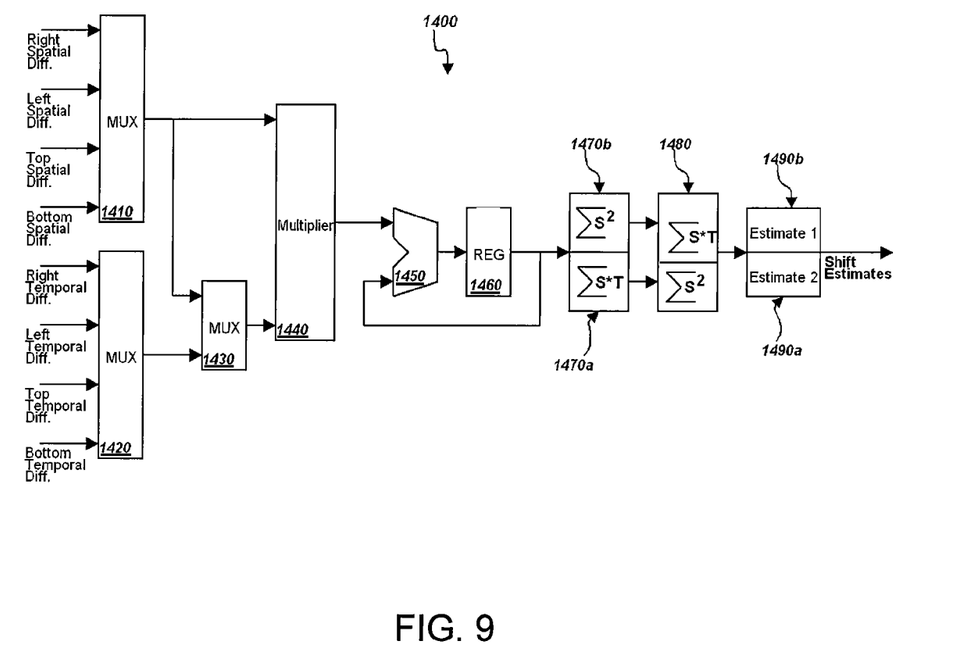
FIG. 9 depicts a simplified block diagram of an embodiment of a Correlator/Estimator for Rotation smear.

FIG. 9 depicts a simplified block diagram of an embodiment of Correlator/Estimator 1400 for Rotation smear. The inputs to Correlator/Estimator 1400 are the Right Spatial, Left Spatial, Top Spatial, Bottom Spatial, Right Temporal, Left Temporal, Top Temporal and Bottom Temporal difference memories 1310a through 1310h, respectively (FIG. 7). Correlator/Estimator 1400 may work in series, correlating for two or more shift ranges, and in each range correlating for the Left portions of the images, and then, reusing the arithmetic units, correlating for Right, Top and Bottom halves of the images. Alternatively, the order may be reversed. Yet alternatively correlation for the four portions and/or the two or more shift ranges can be done in parallel, or in a combination of serial and parallel calculation.

When Right, Left Top or Bottom correlation is calculated, MUX units 1410, 1420 route the corresponding inputs from differential memories 1310a through 1310h (FIG. 7) to their outputs.

In each correlation calculation cycle, calculations for different shift ranges of Top, Right, Bottom and Left will take place, where ranges, for example, could be 0 to 8 and 0 to 8.

Each such correlation cycle, may comprise two phases, where in the First Phase the accumulation of the squares of the values of the Spatial Difference vector is calculated, and in the Second Phase the multiplication products of elements of the Spatial Difference and the Temporal Difference vectors are accumulated, where in each phase correlation for Top, Right, Bottom and Left portions is done. The terms "First Phase" and "Second Phase" are used throughout the foregoing description for the sake of clarity, but, as would be obvious to those ordinarily skilled in the art, the order of the phases may be changed, or the two phases can be done in parallel, all in the scope of the present invention.

In the First Phase MUX 1430 routes the output of MUX 1410 to its output, and in the Second Phase MUX 1430 routes the output of MUX 1420 to its output. Multiplier 1440 multiplies the output of MUX 1410 with the output of MUX 1430. Hence, in the First Phase Multiplier 1440 will calculate the square of the Spatial difference elements, and in the Second Phase it will calculate the multiplications of Spatial and Temporal difference elements.

Adder 1450 and Register 1460 accumulate the results of the multiplications. Register 1460 will be cleared at the beginning of each Phase. After the First Phase its contents will be transferred to register 1470b (designated $\Sigma S^2$) for the storage of the accumulation of the squares of the Spatial vector elements. After the Second Phase, the contents of Register 1460 will be transferred to register 1470a (designated $\Sigma S*T$) for the storage of the accumulation of the multiplications of Spatial and Temporal elements.

Divider 1480 divides the sum of the accumulation of the multiplications of Spatial and Temporal elements ($\Sigma S*T$) by the accumulation of the square Spatial vector elements ($\Sigma S^2$), to yield the shift estimate. This may be done once for each of the Left, Right, Top and Bottom halves, and repeated for the two or more cycles of shift ranges In the first cycle the result of the division is stored in Register 1490b, and in the second cycles it is store din register 1490a. Thus registers 1490a, 1490b will hold shift results for two different ranges. For more than two ranges more estimate registers (not shown) will be employed.

The disclosure of embodiments for the shift estimates of a rotation in a captured image relative to a reference image is now completed. Other embodiments of the same functions include several group sizes, and selection of captures in the sequence which are not necessarily the first capture, for the Reference Image.

In addition, as would be appreciated by those ordinarily skilled in the art, trivial variations of the foregoing do not depart from the scope of the present invention.

Figure 10:
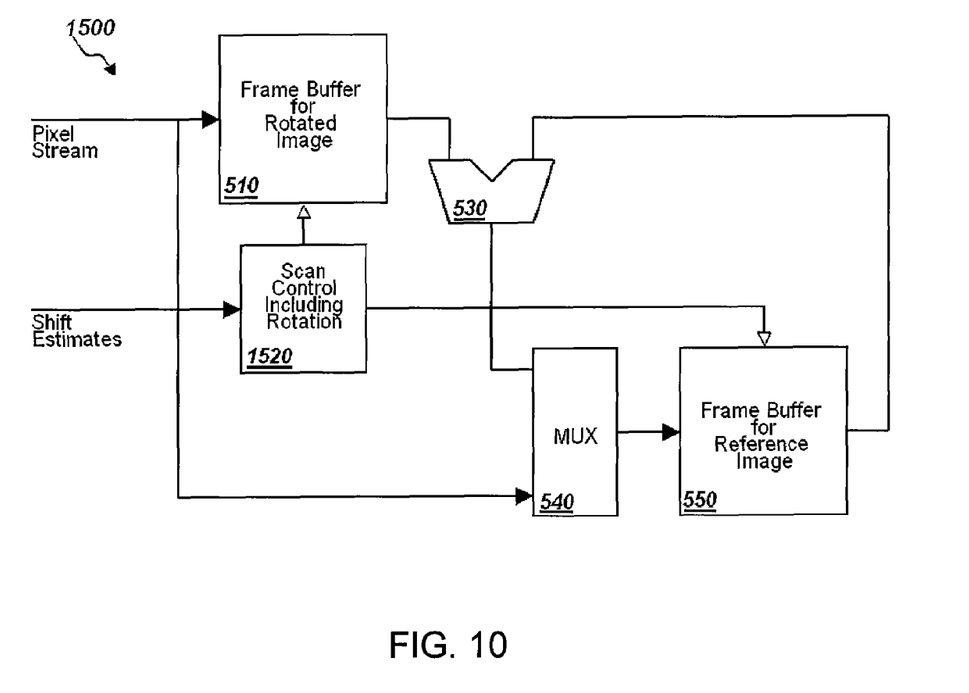
FIG. 10 depicts a De-smear circuit for Rotation smear.

FIG. 10 depicts De-smear circuit 1500 for Rotation smear. It should be noted that De-smear 1500 is similar to De-Smear 500 (FIG. 5), and uses the same sub-units, except for the Scan Control 1520, which, unlike Scan Control 520, can handle rotations.

When the Reference image is captured, MUX 540 may direct the incoming pixel stream to Frame Buffer 550, for storage. Subsequent images, which may be rotated relative to the reference image, may be stored in Frame Buffer 510.

After a Rotated Image is stored in Frame Buffer 510, using Top, Right, Bottom and Left shift Estimates from Correlator/Estimator 1400, the Reference image and the rotated image may be accumulated, including rotation smear correction. Said correction consists of summing the reference image values with values of said rotated image, rotating the rotated image by the inverse of the measured rotation, while they are added. The process described above then repeats for subsequent rotated images.

For example, if shift measurement values of $(T_1,B_1,L_1,R_1)$, $(T_2,B_2,L_2,R_2)$, ... $(T_n,B_n,L_n,R_n)$ are detected for a sequence of n captures following the reference image, the smear corrected sum for pixel (ij) will be calculated by summing: $S(i,j)=\Sigma C_k((i-(T_k+B_k)/2-(j/H)*(T_k-B_k)/2),(j-(L_k+R_k)/2-(i/W)*(L_k-R_k)/2))$, where $S(i,j)$ is pixel $(i,j)$ of the sum image, $C_k(i,j)$ is pixel $(i,j)$ of the capture k, $C_0$ is the reference image, H is half of the vertical distance between the geometric centers of Top and Bottom, in pixels, W is half of the horizontal distance between the geometric centers of Left and Right, in pixels, and $(T_0,B_0,L_0,R_0)=(0,0,0,0)$.

In another aspect of the invention, it is possible to implement Shift De-smear 500 and Rotation De-smear 1500 using JPEG or similar compression, saving the needs for frame buffers 510, 550 (FIG. 5 and FIG. 10).

Figure 11:
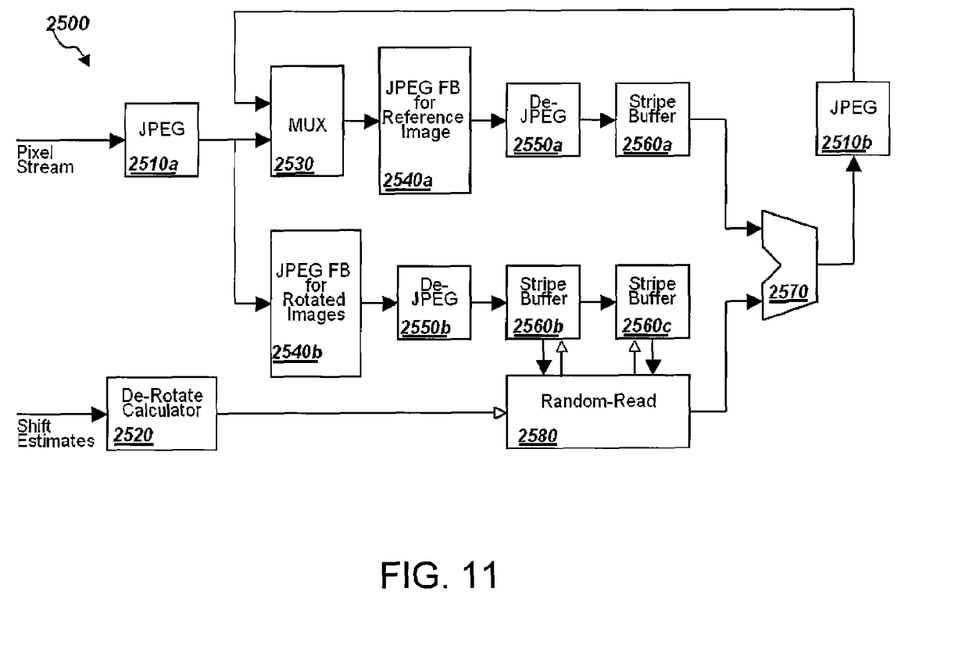
FIG. 11 is an embodiment of a JPEG-based de-smear circuit.

Circuit 2500 of FIG. 11 is an embodiment of such JPEG-based de-smear. Incoming pixel stream for the reference and for the subsequent shifted or rotated images first enters JPEG conversion block 2510a where it is converted to JPEG or other compressed image format, and output to Rotated JPEG Frame Buffer 2540b, and, through MUX 2530, to Reference Image JPEG Frame Buffer 2540a. When the Reference image is scanned, MUX 2530 routes JPEG 2510a output to Reference Image JPEG Frame Buffer 2540a, where it is stored. When subsequent rotated images are scanned, they will be stored in Rotated JPEG Frame Buffer 2540b.

When Rotated images are to be added to the Reference image, which may be done, for example, during Vertical Blank period, the JPEG representation of both the Reference and the Rotated images are first converted to x-y representation. This is done by DE-JPEG 2550a for the Reference image, and by De-JPEG 2550b for the Rotated image. DE-JPEG may be done "on the fly", without the need for a frame buffer.

Outputs from DE-JPEG units 2550a, 2550b, enter Stripe Buffers 2560a, 2560b; and output from Stripe Buffer 2560b enters Stripe Buffer 2560c. Stripe Buffer 2560a may be implemented as a First-In-First-Out (FIFO) memory. Stripe Buffers 2560b, 2560c may be implemented as FIFO memory with additional random-access read capability. Each Stripe Buffer 2560a, 2560b and 2560c should contain at least n lines, where n is the maximum expected vertical displacement of any pixel between the Reference Image and the Shifted or Rotated Image.

Output from Stripe buffer 2560a corresponds to De-JPEG conversion of the Reference Image, delayed by n lines. It is input to Adder 2570, which adds each pixel with the corresponding pixel of the Rotated Image, read by Random Read unit 2580. The result of Adder 2570 corresponds to the sum of the Reference image and the Rotated image, with the latter de-rotated prior to the addition. Said sum is JPEG-converted by JPEG unit 2510b, and fed to MUX 2530. MUX 2530, when image summation is done, will route the output of JPEG 2510b to JPEG Frame Buffer 2540a.

This sequence of events will repeat for subsequent Rotated images, where the JPEG conversion of subsequent images are stored in JPEG Frame Buffer 2540b, and the partial sum of the images is stored in JPEG Frame Buffer 2540a. For each subsequent image, JPEG frame Buffer 2540a will be updated by the JPEG conversion of the sum of the De-JPEG conversion of its last value, with the de-rotated subsequent image, where the latter is JPEG converted into JPEG Frame Buffer 2540b and then De-JPEG converted for the summation.

De-Rotate Calculator 2520 gets Shift Estimates from Correlator/Estimator 1400 (FIG. 7). For every pixel (x,y) of the reference Image, it calculates the corresponding pixel of the rotated image, similarly to Scan Control 1520 (FIG. 10) and according to the same formula: $S(i,j)=\Sigma C_k((i-(T_k+B_k)/2-(j/H)*(T_k-B_k)/2),(j-(L_k+R_k)/2-(i/W)*(L_k-R_k)/2))$ (The reader is referred to description of FIG. 10 above).

The x and y coordinates of each pixel in the rotated image to be added are indicated by De-Rotate calculator 2520 to Random-Read unit 2580, which translates the coordinates to an address in Stripe Buffers 2560b, 2560c, where the corresponding pixel of the rotated or shifted image is located. It then reads the corresponding pixel and outputs it to Adder 2570.

As would be obvious to those ordinarily skilled in the art, resources in 2500 could be shared and time multiplexed. For example, a single JPEG unit could replace both 2510a and 2510b, and a single De-JPEG unit could replace both units 2550a, 2550b, all within the scope of the present invention.

While the principles of the disclosure have been described above in connection with specific apparatuses and methods, it is to be clearly understood that this description is made only by way of example and not as limitation on the scope of the invention.

What is claimed is:

1. A method of capturing a plurality of images, comprising:
    capturing a first image using a pixel array arranged in a plurality of columns and a plurality of rows;
    generating a first set of column sums for the first image, column sums each being a sum of pixel values for each pixel in a column;
    capturing at least a second image using the pixel array;
    generating a second set of column sums for the second image;
    comparing the second image to the first image based on the first and second sets of column sums, thereby detecting that the second image is rotated and/or shifted with respect to the first image;
    manipulating the second image to thereby correct the shift and/or rotation; and
    outputting the first and second images,
    wherein the comparing operation includes generating a set of spatial difference values by using a differentiator to compare each column sum in the first set of column sums to a next column sum in the first set of column sums.

2. The method of claim 1 further comprising:
    calculating a first set of row sums for the first image, row sums each being a sum of pixel values for each pixel in a row; and
    calculating second set of row sums for the second image,
    wherein comparing the second image to the first image is further based on the first and second sets of row sums.

3. The method of claim 1, wherein the comparing operation further includes
    generating a set of temporal difference values by using the differentiator to compare each column sum in the first set of column sums to a corresponding column sum in the second set of column sums.

4. The method of claim 3, wherein the comparing operation further includes
    generating a shift estimate, using an estimator, based on the set of spatial difference values and the set of temporal difference values.

5. The method of claim 4, wherein the manipulating includes
    manipulating the second image, using a de-smear unit, based off the shift estimate generated by the estimator.

* * * * *